United States Patent [19]
Yasuda

[11] Patent Number: 4,633,312
[45] Date of Patent: Dec. 30, 1986

[54] INTERFRAME ENCODING SYSTEM HAVING A BUFFER SIMULATOR

[75] Inventor: Tooru Yasuda, Tokyo, Japan

[73] Assignee: NEC Corporation, Tokyo, Japan

[21] Appl. No.: 768,662

[22] Filed: Aug. 23, 1985

[30] Foreign Application Priority Data

Aug. 23, 1984 [JP] Japan .................. 59-174057
Aug. 23, 1984 [JP] Japan .................. 59-175481

[51] Int. Cl.⁴ .................................. H04N 7/13
[52] U.S. Cl. ........................... 358/136; 375/33
[58] Field of Search ............ 358/133, 136; 375/27, 375/31, 33

[56] References Cited

U.S. PATENT DOCUMENTS 4,051,530  9/1977  Kuroda ............... 375/31
4,517,596  5/1985  Suzuki ............... 375/33
4,534,055  8/1985  Iinuma ............... 381/34

OTHER PUBLICATIONS

*IEEE Transactions on Communications*, vol. COM-29, No. 12, pp. 1868-1876, Dec. 1981.

*Primary Examiner*—Howard W. Britton
*Attorney, Agent, or Firm*—Sughrue, Mion, Zinn, Macpeak and Seas

[57] ABSTRACT

According to the present invention, an encoding system has an interframe encoder for interframe encoding of video signals to supply predictive encoded signals, and a scan converter for converting the predictive encoded signals into predictive encoded signals of a predetermined block structure. A code converter converts effective picture elements in the block-structured predictive encoded signals into variable length codes and ineffective picture elements therein into run length codes. A buffer memory not only stores the code-converted codes but also calculates their occupancy quantity. The present encoding system is further provided with a buffer simulator for calculating, on the basis of the predictive encoded signals and the code-converted signals, the quantity of information stored in the scan converter, an adder for adding simulated information and the buffer occupancy quantity, and a control circuit for controlling generation of interframe encoding information on the basis of the added signals.

3 Claims, 7 Drawing Figures

INTERFRAME ENCODING SYSTEM HAVING A BUFFER SIMULATOR

BACKGROUND OF THE INVENTION

The present invention relates to an interframe encoding system for video signals.

As a high-efficiency encoding system for video signals, there is known an interframe encoding system. In the interframe encoding system, since the quantity of information to be encoded varies from moment to moment with changes in the scene which video signals constitute, a buffer memory is provided at the output of the encoding system for transmitting encoded signals at a constant rate through a transmission line. In order to avoid overflowing or underflowing of this buffer memory, the generation of encoding information has to be controlled by feeding back to the interframe encoder the data occupancy within the buffer memory (buffer occupancy quantity). Furthermore, such an interframe encoding system is equipped with a code converter for two-dimensional run length encoding or block encoding of encoded signals for the purpose of acheiving even higher efficiency in encoding.

However, while two-dimensional run length encoding requires conversion of encoded signals by a two-dimensional scanning method, such scan conversion, for instance the block size of n picture elements by m lines, would result in a delay by the length of time corresponding to m lines and therefore delay between the interframe encoder and the buffer memory arises during scan conversion. As a consequence, there is the disadvantage that the buffer occupancy quantity fedback to the interframe encoder is less by the quantity of information which is under scan conversion and, accordingly, the generation of encoding information cannot be controlled accurately.

SUMMARY OF THE INVENTION

An object of the present invention, therefore, is to provide an interframe encoding system capable of accurately estimating the buffer occupancy quantity by simulating the quantity of encoding information during scan conversion of the interframe encoded signals of video signals.

According to the present invention, an encoding system has an interframe encoder for interframe encoding of video signals to supply predictive encoded signals, and a scan converter for converting the predictive encoded signals into predictive encoded signals of a predetermined block structure. A code converter converts effective picture elements in the block-structured predictive encoded signals into variable length codes and ineffective picture elements therein into run length codes. A buffer memory not only stored the code-converted codes but also calculates their occupancy quantity. The present encoding system is further provided with a buffer simulator for calculating, on the basis of the predictive encoded signals and the code-converted signals, the quantity of information stored in the scan converter, an adder for adding simulated information and the buffer occupancy quantity, and a control circuit for controlling generation of interframe encoding information on the basis of the added signals.

BRIEF DESCRIPTION OF THE DRAWINGS

The above and other objects, features and advantages of the present invention will become apparent from the following detailed description when taken with the accompanying drawings, in which.

DETAILED DESCRIPTION OF A PREFERRED EMBODIMENT

Figure 1:
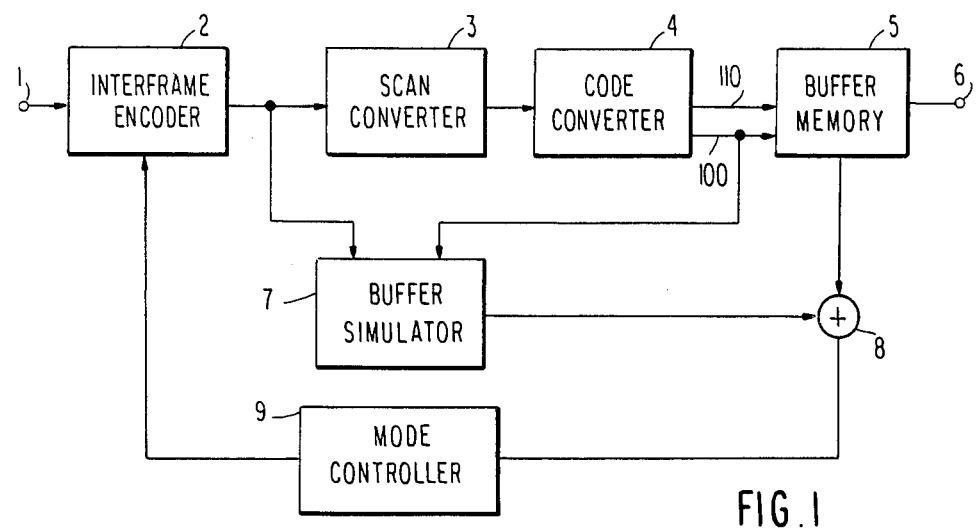
FIG. 1 is a block diagram illustrating a preferred embodiment of the invention.

Referring to FIG. 1, a preferred embodiment of the present invention has an input terminal 1 to which a video signal is supplied, and an interframe encoder 2 having various interframe encoding modes and generating an interframe predictive encoded signal by encoding the video signal in response to a mode control signal given from a mode controller 9. A scan converter 3, as will be described below, converts the scanning lines of the predictive encoded signal. A code converter 4 converts an effective picture element in the scan-converted predictive encoded signal into a variable-length code and an ineffective picture element (for instance picture elements having the "0" level) into a run length code, and feeds them to a buffer memory 5 as a code-converted signal by way of a signal line 110. At this time, the code converter 4 outputs through a signal line 100 the write timing of the code-converted signal into the buffer memory 5. The buffer memory not only stores the code-converted signal from the code converter 4 but also calculates the quantity of information stored in the buffer memory 5 and supplies it to an adder 8 as buffer occupancy signal indicative of the buffer occupancy quantity. On the basis of the predictive encoded signal from the encoder 2 and the write-timing from the code converter 4, a buffer simulator 7 calculates information stored in the scan converter 3, and supplies the calculated result to the adder 8 as a buffer simulation signal. The adder 8 adds the buffer occupancy quantity signal and the buffer simulation signal, and generates a compensated buffer occupancy quantity signal. A mode controller 9, in response to the compensated buffer occupancy quantity signal, controls the encoding mode in the encoder 2 and, through it, the quantity of information to be generated.

For details on the interframe encoder 2 and the buffer memory 5, reference may be made to the U.S. Pat. No. 4,051,530, and on the code converter 4, to FIG. 1 in the U.S. Pat. No. 4,534,055, which is incorporated herewith. Further for details on the mode controller 9, reference may be made to Toshio Kaga et al., "Statistical Performance Analysis of an Interframe Encoder for Broadcast Television Signals", in *IEEE Transactions on Communications*, Vol. COM-29, No. 12, pp. 1868–1876, December 1981.

Figure 2:
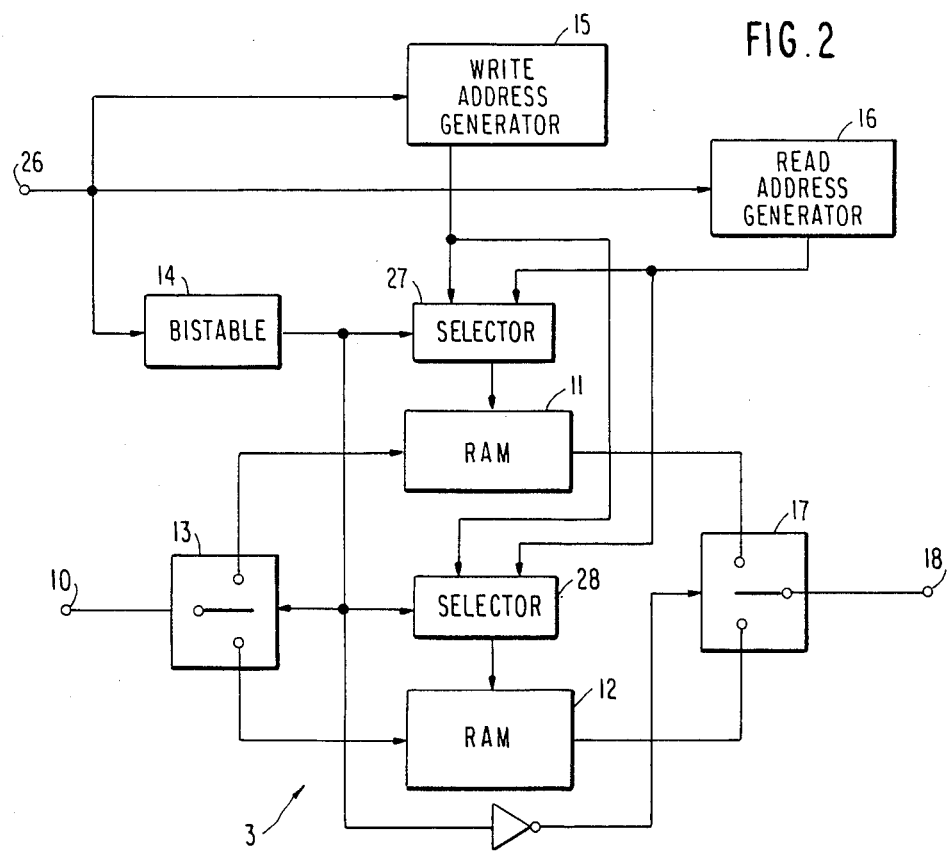
FIG. 2 is a circuit diagram of a scan converter for use in the embodiment shown in FIG. 1.

Referring now to FIG. 2, the scan converter 3 has a terminal 10 to which the interframe encoded signal is inputted. The encoded signal is supplied to random access memories (RAMs) 11 and 12 through a switch 13, which alternately supplies the RAMs 11 and 12 with the encoded signal in response to the output of a bistable circuit 14 driven by a control signal CONT, which indicates the boundary of a block line (FIG. 3) and is fed from a terminal 26. Each of the RAMs 11 and 12 has a capacity to store m lines of video signals (one block line). To write one block line into the RAMS 11 and 12, a write address generator 15 supplies a write address to the RAMS 11 and 12 by way of selectors 27 and 28, respectively. The contents of the RAMs 11 and 12 are read out according to a read address supplied from a read address generator 16 via the selectors 27 and 28, respectively, which select either the write or read address in response to the output of the bistable circuit 14. Here, the selector 27 selects the write address in response to a high level and the read address in response to a low level, and the selector 28 does the opposite operation. Therefore, when one block line is written into one of the RAMs, the contents of the other RAM are read out. The one block line which is read out is supplied to a terminal 18 by way of a switch 17. The write addresses are such addresses that permit sequential writing of m lines of picture elements, and the read addresses, as will be described below, are such ones that permit sequential reading of picture elements in the scanning direction of each block.

Figure 3:
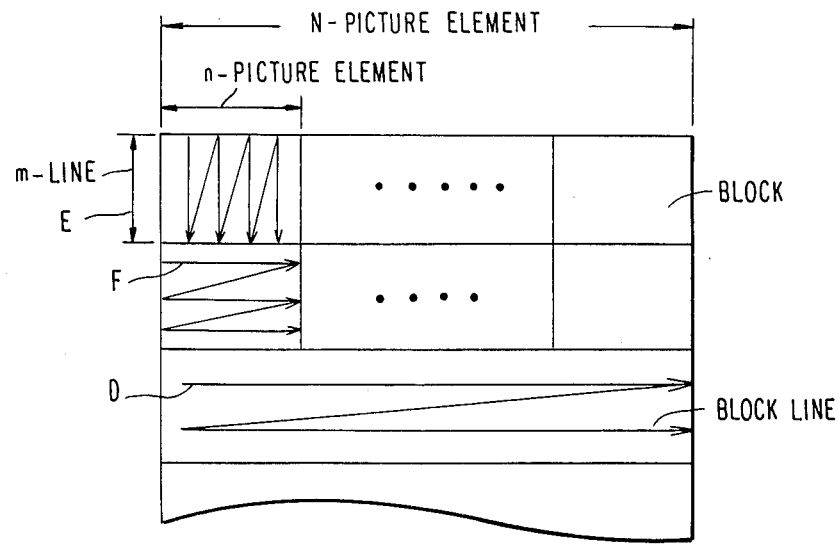
FIGS. 3 to 6 are diagrams for describing the operation of the scan converter.
Figure 4:
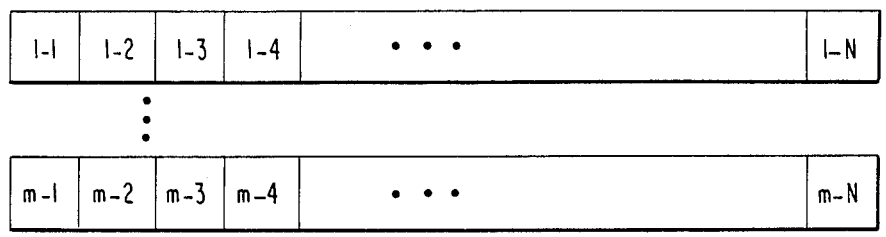
Figure 5:
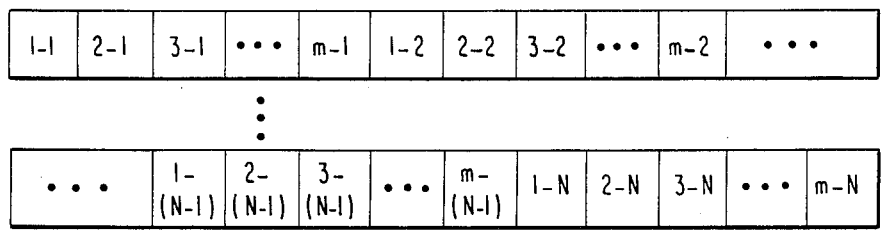

Next will be described the operation of the scan converter 3. As illustrated in FIG. 3, each picture frame is divided into a plurality of blocks, each consisting of m lines of n picture elements. A video signal to be used when such a frame is to be scanned in a horizontal direction D can be schematized as shown in FIG. 4, wherein each picture element is identified by the reference numeral of the line it belongs to and by that of the picture element position on that line. For instance, "1-4" represents the fourth picture element on the first line. Suppose here that m lines of picture elements are written into the RAM 11 as illustrated in FIG. 4. The contents of the RAM 11 are read out when the next m lines (one block line) are written into the RAM 12. FIG. 5 shows the order of picture elements to be read out of the RAM 11. A sequence of those picture elements corresponds to a video signal which results from the scanning of each block in the vertical direction E (FIG. 3).

Figure 6:
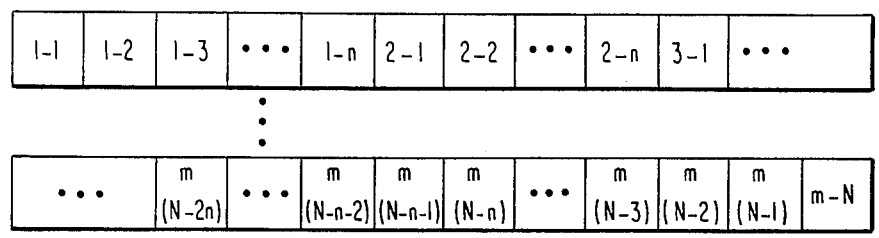

In the scan conversion process illustrated in FIG. 5, where the ineffective picture element in the predictive encoded signal is converted into the run length code, since there is a difference between the continuity of the ineffective picture element in the predictive encoded signal scanned in the direction E and that of the ineffective picture element in the predictive encoded signal scanned in the direction D, there will occur a difference in the quantity of run length encoding information of ineffective picture elements. A scan conversion process illustrated in FIG. 6 reduces this difference in information quantity attributable to the difference in scanning direction, as shown in FIG. 5, by using the same scanning direction for both the writing of input video signal and the reading of picture element blocks. In FIG. 6, the picture elements which are scanned in the horizontal direction D and stored in the RAM 11 are read out of the RAM 11 in the horizontal direction F, that is in order of picture elements on each line of each block.

Figure 7:
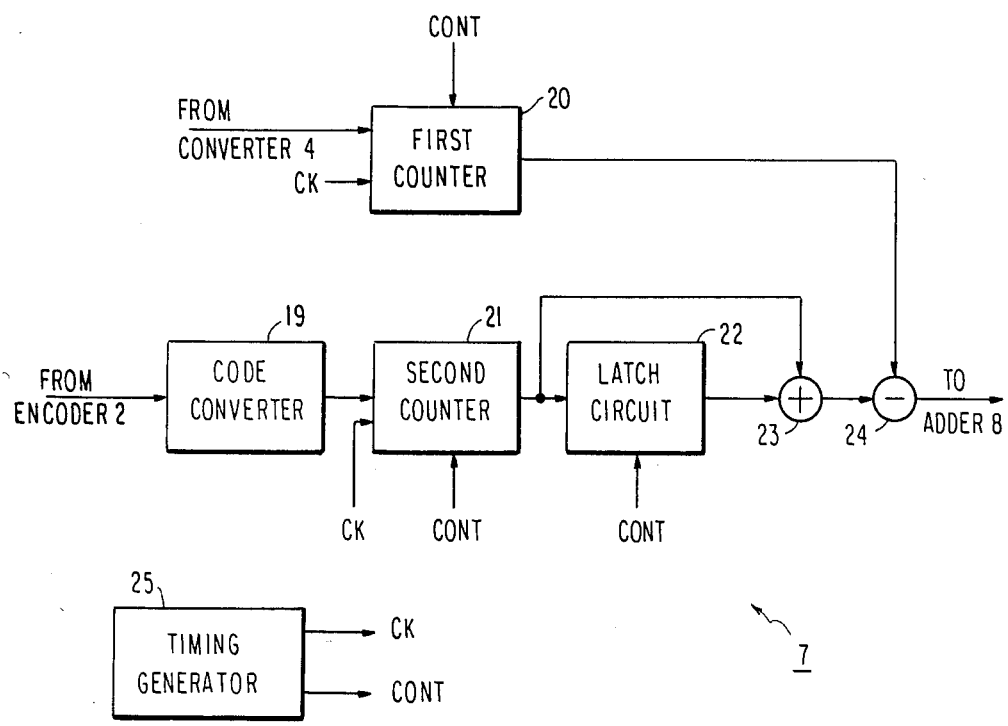
FIG. 7 is a circuit diagram of a buffer simulator for use in the preferred embodiment of the present invention.

Referring now to FIG. 7, the buffer simulator 7 has a code converter 19 which converts the encoded signal prior to scan conversion into the run length code and variable length code, and first and second counters 20 and 21. This converter 19 has the same structure as the converter 4 and, althrough it outputs a code-converted signal and timing signal (corresponding to the write timing into the buffer memory from the converter 4) indicating the output timing of the code converted signal, the timing signals alone are referred to in FIG. 7.

The counter 20 calculates an information quantity A generated by the converter 4 by counting clock pulses CK entered in response to the write timing. Supposing that the RAM 11 is used for writing and the RAM 12 for reading now, the information quantity A corresponds to the quantity of information read out of the RAM 12. Meanwhile the counter 21 calculates an information quantity B of the code-converted signal by counting the clock pulses CK in response to the timing signal from the converter 19. The information quantity B corresponds to the quantity of information written into the RAM 11. These counters 20 and 21 are reset by the control signal CONT, which is given from a timing generator 25 and indicates the boundary of the block line (FIG. 3). A latch circuit 22 latches the output of the counter 21 in response to the control signal CONT. The latch output represents an information quantity C, which has been generated in the immediately preceding block line.

Accordingly, a total information quantity X currently stored in the RAMs 11 and 12 combined can be represented by the following equation:

$$X = A + B - C$$

An adder 23 is used for adding the information quantities A and B, and a subtractor 24, for subtracting the information quantity C from the sum (A+B). The clock CK is set equal to the sampling rate of video signals.

As hitherto described, according to the present invention, the quantity of information in the scan converter 3 is estimated and the signal of estimation is added to the buffer occupancy quantity signal, which can therefore be determined accurately, with the result that the quantity of information to be generated by the predictive encoder can be controlled precisely.

What is claimed is:

1. An interframe encoding system comprising encoding means for performing interframe predictive encoding of a video signal to generate a predictive encoded signal; scan converting means for converting the predictive encoded signal into a scan converted signal of a predetermined block; code converting means for converting an effective picture element in the scan converted signal into a variable-length code and an ineffective picture element therein into a run length code to generate a code-converted signal; buffer memory means for storing the code-converted signal and for generating a buffer memory occupancy signal by calculating the quantity to be occupied by the code-converted signal; simulating means for generating a simulation signal by calculating, on the basis of said predictive encoded signal and said code-converted signal, the quantity of information stored in said scan converting means; means responsive to said buffer memory occupancy signal and said simulation signal for generating a compensated buffer memory occupancy signal; and mode controlling means responsive to the compensated buffer memory occupancy signal for controlling the generation of said predictive encoded signal.

2. An interframe encoding system as claimed in claim 1, wherein said simulating means comprises first counting means for counting the quantity of information generated by said code converting means; second counting means for counting the quantity of information generated by said scan converting means; memory means for storing information generated by said scan converting means in one scan conversion period; adder means for adding the output of said memory means and that of said second counting means; and subtractor means for subtracting the output of said first counting means from the output of said adder means.

3. An interframe encoding system as claimed in claim 1, wherein said scan converting means comprises first and second random access memories into which the output of said encoding means is alternately written and whose content is alternately read; write address generator means for supplying said memories with a write address to sequentially write the output of said encoding means in a horizontal scanning direction; and read address generator means for so supplying said memories with a read address as to provide a signal resulting from the scanning of each of said block in the horizontal direction.

* * * * *